(12) United States Patent
Lee et al.

(10) Patent No.: US 6,170,734 B1
(45) Date of Patent: Jan. 9, 2001

(54) METHOD OF JOINING SILICON NITRIDE TO CARBON STEEL

(75) Inventors: Jae Do Lee; Young Min Choi, both of Daejeon (KR)

(73) Assignee: Korea Research Institute of Chemical Technology, Daijeon (KR)

( * ) Notice: Under 35 U.S.C. 154(b), the term of this patent shall be extended for 0 days.

(21) Appl. No.: 09/359,675

(22) Filed: Jul. 23, 1999

(30) Foreign Application Priority Data

Jul. 24, 1998 (KR) .................................................. 98-29908

(51) Int. Cl.[7] .............................. B23K 31/02; B23K 1/20; B23K 5/213; B28B 1/00; B28B 3/00
(52) U.S. Cl. ........................ 228/122.1; 228/120; 228/203; 228/262.43; 264/647; 264/665
(58) Field of Search ..................................... 228/120, 203, 228/262.1, 262.43, 122.1; 264/647, 603, 665

(56) References Cited

U.S. PATENT DOCUMENTS

| | | | |
|---|---|---|---|
| 4,483,810 | * | 11/1984 | Bunk et al. . |
| 4,612,207 | * | 9/1986 | Jansen . |
| 4,834,926 | * | 5/1989 | Iwasaki et al. . |
| 4,954,386 | * | 9/1990 | Mizunoya et al. . |
| 5,001,019 | * | 3/1991 | Ito et al. . |
| 5,188,781 | * | 2/1993 | Peuckert . |
| 5,309,874 | * | 5/1994 | Willermet et al. . |
| 5,390,843 | * | 2/1995 | Ito et al. . |
| 5,407,119 | * | 4/1995 | Churchill et al. . |
| 5,738,820 | * | 4/1998 | Ukegawa et al. . |
| 5,904,993 | * | 5/1999 | Takeuchi et al. . |

FOREIGN PATENT DOCUMENTS

| | | | |
|---|---|---|---|
| 63-274679A | * | 11/1988 | (JP) . |
| 4202199075A | * | 8/1990 | (JP) . |
| 04343287A | * | 10/1992 | (JP) . |

* cited by examiner

*Primary Examiner*—Patrick Ryan
*Assistant Examiner*—Colleen Cooke
(74) *Attorney, Agent, or Firm*—Finnegan, Henderson, Farabow, Garrett & Dunner, L.L.P.

(57) ABSTRACT

This invention relates to a method of joining silicon nitride having on its surface a thin layer of active silicon metal to carbon steel, wherein the active silicon layer is formed through the thermal dissociation of silicon nitride($Si_3N_4$) into silicon(Si) and nitrogen gas($N_2$). The active silicon layer is directly joined to carbon steel via an induced eutectic melting reaction between the silicon (Si) an iron (Fe) of carbon steel, or via brazing of two materials Ag—Cu alloys. This joining process does not require the use of expensive Ag—Cu—Ti active brazing alloys containing an active metal (Ti) or a sputtering method designed to coat the active metals on surface of silicon nitride.

5 Claims, 5 Drawing Sheets

METHOD OF JOINING SILICON NITRIDE TO CARBON STEEL

BACKGROUND OF THE INVENTION

1. Field of the Invention

This invention relates to a method of joining silicon nitride having a thin layer of active silicon metal to carbon steel, wherein the active silicon layer is formed through the thermal dissociation of silicon nitride ($Si_3N_4$) into silicon (Si) and nitrogen gas ($N_2$). The active silicon layer may be directly joined to carbon steel via an induced eutectic melting reaction between Si and the iron (Fe) found in carbon steel, or via brazing of two materials such as Ag—Cu alloys.

2. Description of the Related Art

Recently, ceramic-based materials have been applied to commercial machine parts in an effort to improve efficiency and performance. The fabrication of such ceramics containing parts has generally been carried out by joining ceramic and metal, such as by joining $Si_3N_4$ and carbon steel. Due to intrinsic properties associated with different materials, however, the techniques designed to join such materials remain difficult. For example, the interfacial energy between silicon nitride and Ag—Cu alloys ($Y_{Si3N4/AgCu}$) is larger than the sum of the surface energy of silicon nitride ($Y_{S3N4}$) and Ag—Cu alloys ($Y_{Ag—Cu}$) alone. Therefore, these two materials do not completely wet on contact, and the joining of these two materials is difficult.

To overcome the above-described problems, Ag—Cu—Ti alloys containing silicon nitride and a highly active metal (e.g., Ti) have been used instead of Ag—Cu alloys. However, the Ag—Cu—Ti system is very expensive (about ten times higher than Ag—Cu alloys), which result in higher production costs.

Therefore, other methods have been used to join silicon nitride to carbon steel in which only the surface of silicon nitride is coated with a highly active metals (e.g., Ti, Zr) via physical method such as sputtering. This type of method activates the surface of silicon nitride such that joining can be made using Ag—Cu alloys. However, this joining method has the disadvantages of not only being very complicated but of requiring a large initial investment for sputtering equipment, which also results in increased production costs. Therefore, there is a need for a simple and economical process to join silicon nitride and carbon steel.

SUMMARY OF THE INVENTION

An object of the present invention, therefore, is to provide a simple and economical process for joining silicon nitride to carbon steel using low-priced alloys, or via direct joining two materials through a eutectic melting method. The inventors have discovered that when a thin layer of active silicon is introduced to the surface of sintered silicon nitride ($Si_3N_4$) via an in situ thermal treatment process, the silicon nitride can be easily joined to carbon steel without using a sputtering method or high-priced alloys.

DETAILED DESCRIPTION OF THE INVENTION

As explained in more detail below, this invention is directed to a process for joining silicon nitride to carbon steel. Since the interfacial energy between silicon nitride and Ag—Cu alloys is larger than the sum of surface energies of silicon nitride and Ag—Cu alloys, these two materials do not completely wet on contact. To overcome such drawback, silicon nitride is joined to carbon steel by modifying the surface of the silicon nitride. In the present invention, silicon nitride is thermally treated under a nitrogen atmosphere or a vacuum to form an active silicon layer on the surface of silicon nitride. Carbon steel is subsequently joined to the surface of an active silicon layer using a process described below.

A silicon nitride green body is sintered and then thermally treated under a nitrogen atmosphere (~1 atm) and at a temperature of about 1,790~1,950° C. Alternatively, sintered silicon nitride is thermally treated under vacuum ($<10^{-2}$ torr) and at a temperature of about 1,250~1700° C. Either of the above thermal treatments dissociates the surface of the silicon nitride into silicon and nitrogen gas, and results in the formation of an active silicon layer with a thickness of 1~100 $\mu$m on the surface of the sintered silicon nitride. This active silicon layer is subsequently joined to carbon steel using either Ag—Cu alloys, or an induced eutectic melting reaction between the silicon and the iron of the carbon steel.

Examples of carbon steel used for this invention include a series of SCM and SNCM belonging to the JIS(Japanese Industrial Standards), and the chemical composition of low/medium carbon steel containing Fe as an major ingredient, 0.13~0.35 wt % of carbon and further including Mn, Si, Ni, Cr, and Mo.

Figure 1:
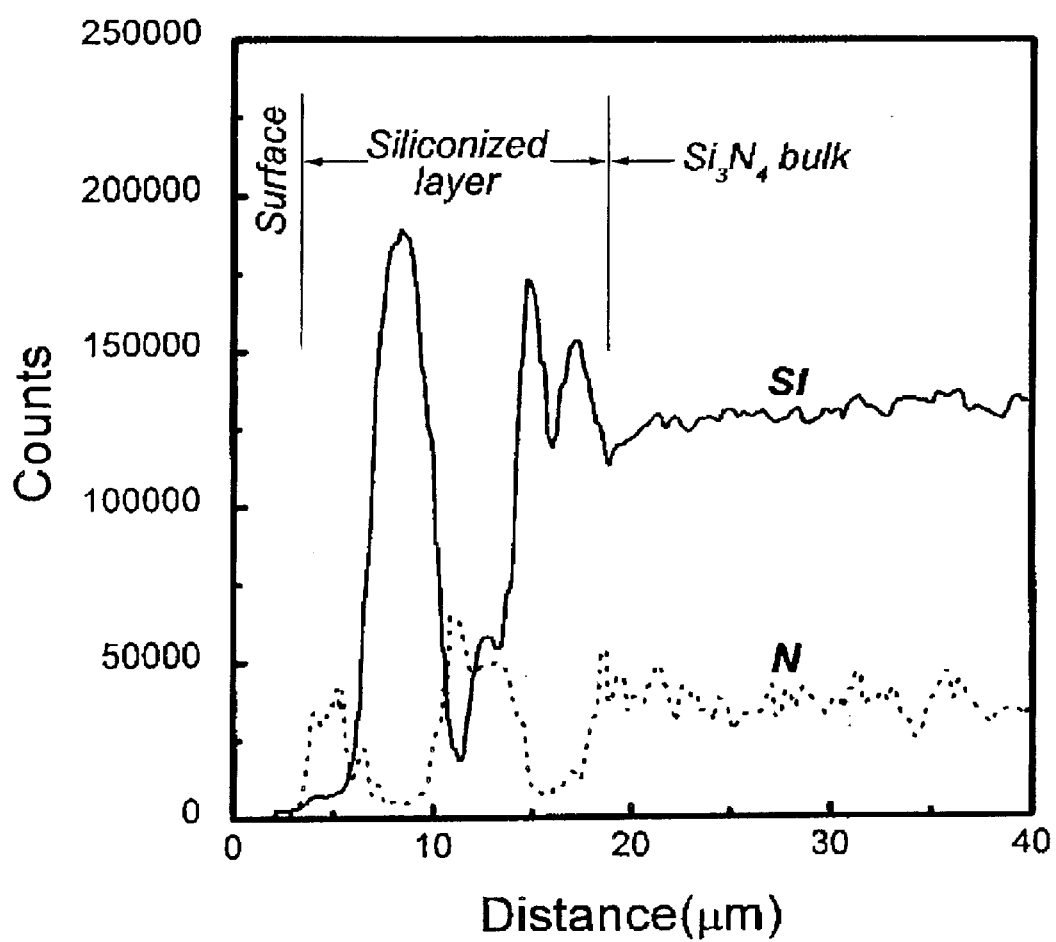
FIG. 1 is a graph showing the results of EPMA analysis on the fracture surface of silicon nitride having an active silicon layer.

As shown, the thermally treated surface of silicon nitride is dissociated into silicon and nitrogen gas. By using this technique to form a silicon layer in-situ on the surface of sintered silicon nitride, the inventors have discovered that two different materials can be joined, here silicon nitride to carbon steel. FIG. 1 shows that the silicon concentration is significantly increased on the silicon nitride surface, compared to the interior of the silicon nitride, thus forming an active silicon layer.

In one embodiment, surface modification occurs using a silicon nitride green body that is sintered and then thermally treated under nitrogen atmosphere (~1 atm) while at the temperature of 1,760~1,950° C. If the thermal treatment is performed under a nitrogen atmosphere at a temperature of less than 1,760° C., physical properties of the silicon nitride such as strength and hardness are lowered. When the thermal treatment is performed at a temperature exceeding 1,950° C., an excessive silicon layer is generated.

Figure 2:
FIG. 2 is a scanning electron microscope (SEM) micrograph showing an active silicon layer formed by thermal dissociation on a silicon nitride surface.

In another embodiment, the surface of silicon nitride is modified using a sintered silicon nitride that is thermally treated under vacuum (of less than about $10^{-2}$ torr) while at a temperature of about 1,250~1,700° C. If the thermal treatment is performed under vacuum at a temperature of less than 1,250° C., the silicon layer forms too slowly. When thermal treatment is performed at a temperature exceeding 1,700° C., the silicon layer forms too rapidly, and thus cannot be properly controlled. As shown in the accompanying FIG. 2, a chemically bonded active silicon layer with a thickness of 1~100 μm is formed at the thermally treated surface of silicon nitride.

The joining of the surface-modified silicon nitride to carbon steel is performed by either using Ag—Cu alloys or by an induced eutectic melting between two materials. The present invention is advantageous in that the joining effect of two different materials can be ensured using inexpensive Ag—Cu alloy as well as the Ag—Cu—Ti system. This benefit occurs because the interfacial energy ($Y_{Si/Ag-Cu}$) between silicon formed on the surface of silicon nitride and Ag—Cu alloys is much smaller than the interfacial energy between silicon nitride and Ag—Cu alloys ($Y_{Si3N4/AgCu}$), or the surface energy of silicon ($Y_{Si}$) and Ag—Cu alloys ($Y_{Ag-Cu}$) alone. Accordingly, two different materials wet well on contact without requiring the use of expensive Ag—Cu—Ti active brazing alloys containing Ti and Zr that are traditionally used in the prior art.

Figure 3A:
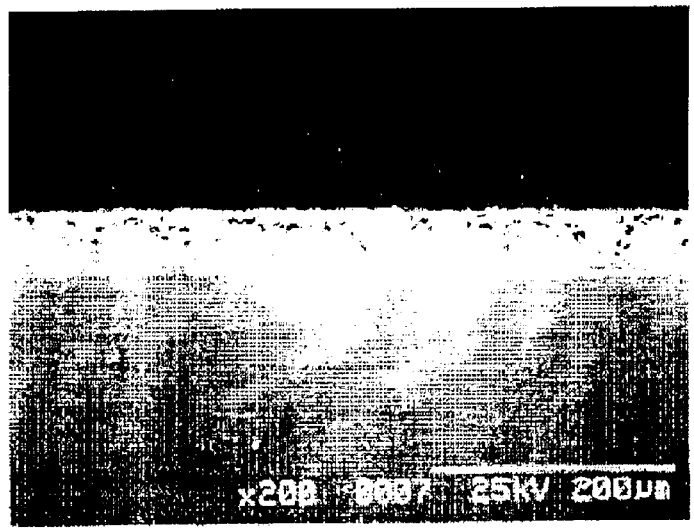
FIG. 3a is an SEM micrograph showing the interface between an active silicon layer (formed from silicon nitride) and carbon steel, wherein the active silicon layer is joined to carbon steel using Ag—Cu alloys.
Figure 3B:
FIG. 3b is an SEM micrograph showing the interface between silicon nitride and Ag—Cu alloys, wherein an active silicon layer (formed from silicon nitride) is joined to carbon steel using Ag—Cu alloys.
Figure 3C:
FIG. 3c is an SEM micrograph showing the interface between carbon steel and Ag—Cu alloys, wherein an active silicon layer (formed from silicon nitride) is joined to carbon steel using Ag—Cu alloys.

According to this invention, the process for joining silicon nitride to carbon steel using Ag—Cu alloys is performed by placing Ag—Cu alloys between the active silicon layer formed on the surface of silicon nitride and carbon steel under vacuum ($<10^{-2}$ torr) or inert gas at the temperature of 600~700° C. FIG. 3a, FIG. 3b and FIG. 3c show that two different materials can be preferably joined, since Ag—Cu alloys are well wetted on the surface of both silicon nitride and carbon steel.

Figure 4:
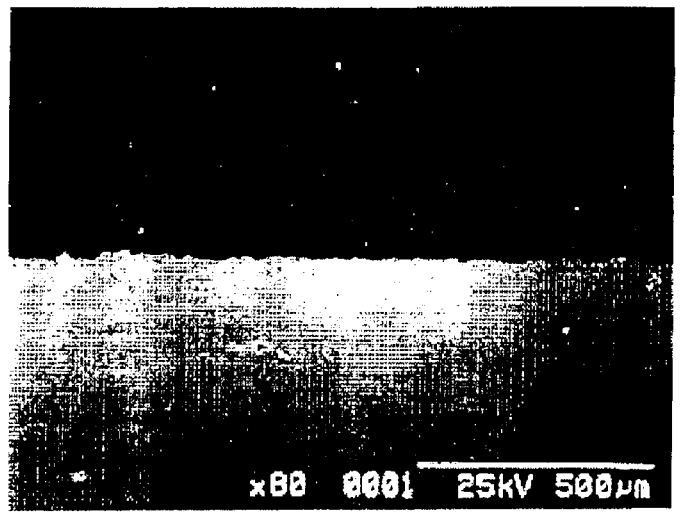
FIG. 4 is an SEM micrograph showing the interface between silicon nitride and carbon steel, wherein silicon nitride forms an active silicon layer that is directly joined to carbon steel.
Figure 5:
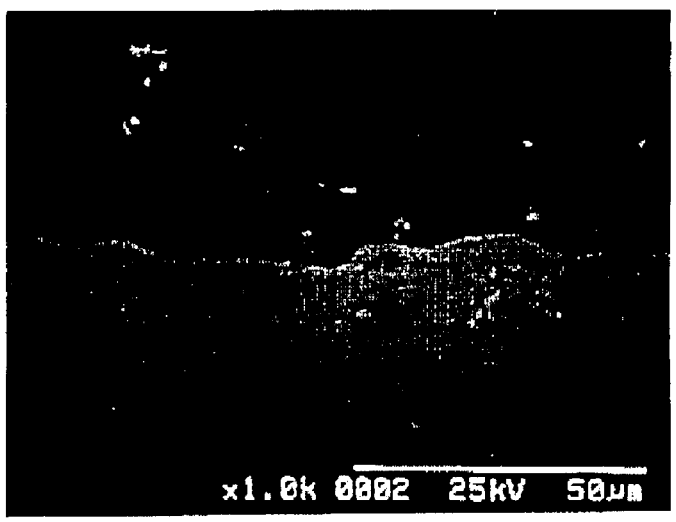
FIG. 5 is an SEM micrograph showing the interface between silicon nitride and carbon steel, wherein silicon nitride forms an active silicon layer that is, directly joined to carbon steel via a chemical eutectic melting reaction.

Alternatively, another process for joining silicon nitride to carbon steel according to this invention involves directly joining silicon at the modified surface of silicon nitride to carbon steel via an induced eutectic melting reaction between silicon and the iron of carbon steel. The eutectic melting reaction is performed under vacuum (of less than $10^{-2}$ torr) and at a temperature of 1,100~1300° C. If the reaction temperature is less than 1,100° C., the eutectic melting reaction does not occur. If the reaction temperature exceeds 1,300° C., excess melting of the eutectic phases rapidly occurs. Through the eutectic melting reaction, silicon nitride can be directly joined to carbon steel. (See FIG. 4). As shown in FIG. 5, an induced eutectic melting reaction between silicon on the modified surface of silicon nitride and the iron found in carbon steel leads to the direct joining of silicon carbide to carbon steel by the formation of an iron silicide eutectic melting phase.

The inventors have discovered that the present this invention, which is designed to form an active silicon layer through the modification of the surface of silicon nitride, has the following advantages:

1) it does not require the use of expensive alloys or a sputtering process; rather, the joining properties of silicon nitride to carbon steel are maximized either by the use of Ag—Cu alloys, or by direct joining of two different materials using a eutectic reaction; and 2) when silicon nitride is directly joined to carbon steel by the eutectic reaction phases of iron silicide, the silicon nitride/carbon steel joint can operate at a temperature of up to about 1,100° C. due to the fact that the eutectic melting temperature of iron silicide is more than 1,200° C.

The present invention may be explained in more detail by the following Examples, but it is not limited by these Examples.

EXAMPLE 1

Joining of Surface-Modified Silicon Nitride and Carbon Steel Using Ag—Cu Alloys

A silicon nitride body was sintered under nitrogen atmosphere (1 atm) at 1,760° C. for 2 hours. The silicon nitride surface was then modified by exposing it to a temperature of 1,8200° C. for 5 minutes such that an active silicon layer was formed prior to joining. Ag—Cu alloys (BAg8, Heesung Metal Co.) was next placed between the silicon nitride with the active silicon layer and a carbon steel (SNCM630, JIS). The silicon nitride with the active silicon layer was joined to a medium carbon steel in a boron nitride (BN) jig under vacuum ($10^{-5}$ torr) and at a temperature of 650° C. for 10 minutes.

EXAMPLE 2

Joining of Surface-Modified Silicon Nitride and Carbon Steel via Eutectic Melting Reaction Using the same procedure described in Example 1, silicon nitride with the active silicon layer was directly joined to a carbon steel (SCM415, JlS) in a BN jig via a eutectic melting reaction under vacuum ($10^{-5}$ torr) and at a temperature of 1,250° C. for 10 minutes.

EXAMPLE 3

Joining of surface-modified silicon nitride and carbon steel using Ag—Cu alloys

Silicon nitride, which was sintered to a shape having a diameter of 30 mm and a thickness of 2 mm, was thermally treated under vacuum ($10^{-5}$ torr) and at a temperature of 1,500° C. for 10 minutes to form an active silicon layer prior to joining. This silicon nitride with the active silicon layer was then joined to a carbon steel (SNCM630, JIS) in a BN jig under vacuum ($10^{-5}$ torr) and at a temperature of 650° C. for 10 minutes, with Ag—Cu alloys (BAg8, Heesung Metal Co.) placed between the two materials.

COMPARATIVE EXAMPLE 1

Joining of Surface-Unmodified Silicon Nitride and Carbon Steel Using Ag—Cu Alloys Using the same procedure described in Example 1, a surface-unmodified sintered silicon nitride was joined to a medium carbon steel (SNCM630), with Ag—Cu alloys (BAg8, Heesung Metal Co.) placed between the two materials.

COMPARATIVE EXAMPLE 2

Joining of Surface-Unmodified Silicon Nitride and Carbon Steel Using Ag—Cu—Ti Alloys A surface-unmodified sintered silicon nitride was joined to a medium carbon steel (SNCM630) under vacuum ($10^{-5}$ torr) and at a temperature of 790° C. for 10 minutes, with Ag—Cu—Ti alloys (TKC710, Tanaka Jewel Co.) placed between the two materials.

EXPERIMENTAL EXAMPLE

The wetting, joining interface, and joining strength of the joined parts made in accordance with Examples 1–3 and Comparative Examples 1 and 2 were evaluated in the manner described below. The results are shown in the following table 1.

(1) Wetting test

To investigate the wetting between silicon nitride and alloys, 10×10 mm alloys were placed on silicon nitride with a diameter of 30 mm. The temperature of each alloy was then increased to an optimal joining temperature.

(2) Joining condition test

The joining interface between silicon nitride and carbon steel was investigated by cutting through the joined region with a diamond wheel. The cross-section was then observed with a scanning electron microscope (S-2150, Hitachi).

(3) Joining strength test

The joining strength of each example was measured by a DBS (Double Brazed Shear strength) method on a 3×4×40 mm joint bar based on a 4-point bend strength.

TABLE 1

| Category | Example | | | Comparative examples | |
| --- | --- | --- | --- | --- | --- |
| | 1 | 2 | 3 | 1 | 2 |
| Wetting | Excellent | No alloy employed | Excellent | Poor | Excellent |
| Joining Interface | Very excellent | Good | Very good | Unavailable joining | Very good |
| Joining Strength (MPa) | 198 | 100 | 200 | — | 200 |

Figure 6:
FIG. 6 is an SEM micrograph showing the test results of wetting of alloys to ceramic.

The test results of wetting are shown in FIG. 6. According to comparative example 2, when a surface-unmodified silicon nitride was joined to carbon steel in the presence of an active alloy containing Ti, the wetting conditions were excellent. However, as shown in comparative example 1, when a surface-unmodified silicon nitride was joined to carbon steel in the presence of an inactive alloy, the joining of two different materials was not possible because the surface of silicon nitride was not wetted. In contrast, Example 1 shows that a surface-modified silicon nitride, when in the presence of alloys not containing Ti, resulted in excellent wetting between the alloys and the activated silicon nitride.

When the joined regions were cut by a diamond wheel and observed by an electron microscope, Ag—Cu alloys were well joined to the surfaces of both silicon nitride and carbon steel. See Example 1 and FIG. 3a and FIG. 3b. Under this better wetting interface, the joined strength was about 200 MPa, which is equivalent to a sample that included active brazing alloys, such as described in comparative example 2. Further, a favorable joined region was available in the presence of eutectic melting phases of iron silicide in the interface of both silicon nitride and carbon steel. See Example 2 and FIG. 4 and FIG. 5. The joining strength was about 50% of that in Example 1, which included an Ag—Cu brazing alloy.

What is claimed is:

1. A process for joining silicon nitride to carbon steel, said process comprising:

thermally treating silicon nitride under a nitrogen atmosphere or a vacuum in a controlled manner to dissociate said silicon nitride and form an active silicon layer on the surface of said silicon nitride; and joining carbon steel to said active silicon layer.

2. The process for joining silicon nitride to carbon steel according to claim 1, wherein said thermally treating is performed under a nitrogen atmosphere of about 1 atm, and at a temperature of about 1,760° C. to about 1,950° C.

3. The process for joining silicon nitride to carbon steel according to claim 1 wherein said thermally treating is performed under a vacuum of <$10^{-2}$ torr and at a temperature of about 1,250° C. to about 1,700° C.

4. The process for joining silicon nitride to carbon steel according to claim 1, wherein said joining comprises placing Ag—Cu containing alloys between the active silicon layer formed on the surface of silicon nitride and carbon steel under a vacuum of <$10^{-2}$ torr or in an inert gas containing atmosphere that is at a temperature of about 600° C. to about 700° C.

5. The process for joining silicon nitride to carbon steel according to claim 1, wherein said joining occurs by forming an iron-silicide phase via a eutectic melting reaction between silicon from said active silicon layer and iron from said iron-containing carbon steel performed under a vacuum of <$10^{-2}$ torr and at a temperature of about 1,100° C. to about 1,300° C.

* * * * *